(12) United States Patent
Connell

(10) Patent No.: US 7,788,485 B2
(45) Date of Patent: Aug. 31, 2010

(54) METHOD AND SYSTEM FOR SECURE TRANSFER OF ELECTRONIC INFORMATION

(76) Inventor: John M. Connell, 21645 Kent Ct., Frankfort, IL (US) 60423

( * ) Notice: Subject to any disclaimer, the term of this patent is extended or adjusted under 35 U.S.C. 154(b) by 1503 days.

(21) Appl. No.: 10/913,841

(22) Filed: Aug. 6, 2004

(65) Prior Publication Data

US 2005/0033958 A1    Feb. 10, 2005

Related U.S. Application Data

(60) Provisional application No. 60/493,162, filed on Aug. 7, 2003.

(51) Int. Cl.
*H04L 29/06* (2006.01)
(52) U.S. Cl. .................. 713/157; 713/175; 709/206
(58) Field of Classification Search ......... 713/155–157, 713/175–176, 178, 180, 151–153; 709/206
See application file for complete search history.

(56) References Cited

U.S. PATENT DOCUMENTS

| 5,450,493 | A | 9/1995 | Maher | |
|---|---|---|---|---|
| 5,896,499 | A | 4/1999 | McKelvey | |
| 6,430,688 | B1 * | 8/2002 | Kohl et al. | 713/156 |
| 6,732,101 | B1 | 5/2004 | Cook | |
| 6,886,096 | B2 | 4/2005 | Appenzeller | |
| 6,931,532 | B1 | 8/2005 | Davis | |
| 6,986,037 | B1 | 1/2006 | Assmann | |
| 7,046,991 | B2 | 5/2006 | Little | |
| 7,131,003 | B2 | 10/2006 | Lord | |
| 7,136,840 | B2 | 11/2006 | Pinkas | |
| 7,162,738 | B2 | 1/2007 | Dickinson, III | |
| 7,240,199 | B2 * | 7/2007 | Tomkow | 713/168 |
| 2002/0059144 | A1 * | 5/2002 | Meffert et al. | 705/51 |
| 2002/0091928 | A1 * | 7/2002 | Bouchard et al. | 713/178 |
| 2003/0088771 | A1 * | 5/2003 | Merchen | 713/175 |

* cited by examiner

*Primary Examiner*—Gilberto Barron, Jr.
*Assistant Examiner*—Virginia Ho
(74) *Attorney, Agent, or Firm*—Lesavich High Tech Law Group, P.C.; Stephen Lesavich

(57) ABSTRACT

A method and system for secure transfer of electronic information. The method and system allow secure transfer of electronic information, such as electronic mail (e-mail) using digital certificates.

11 Claims, 14 Drawing Sheets

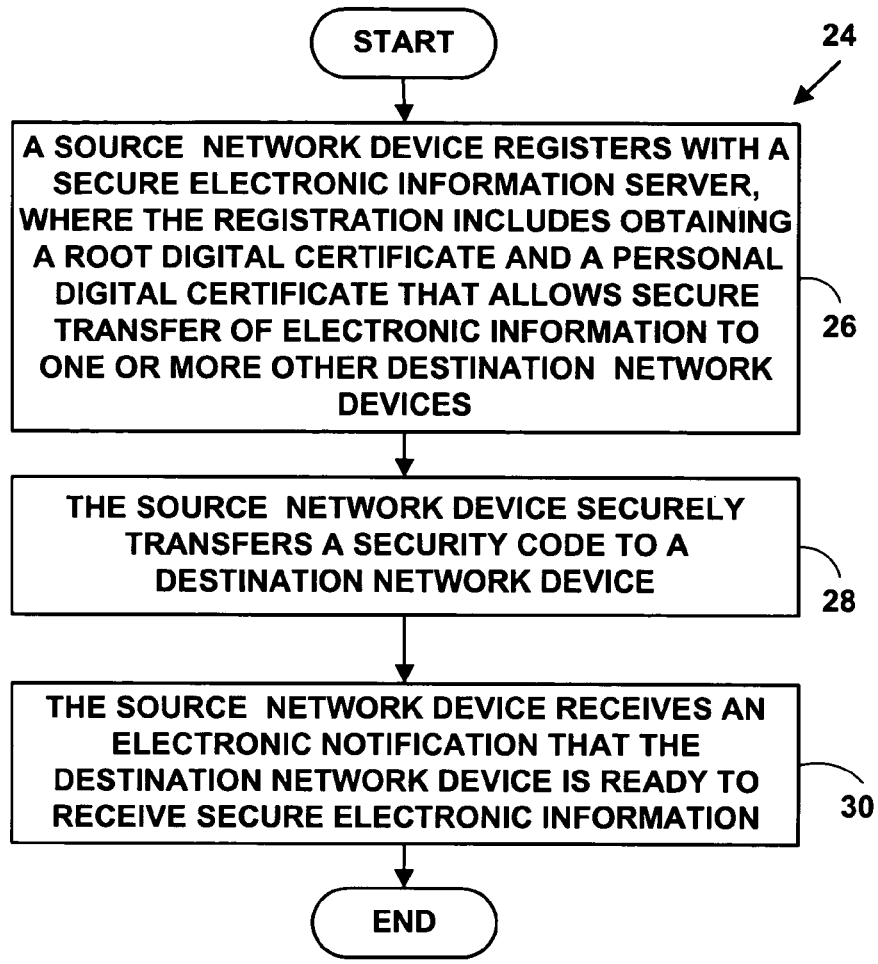

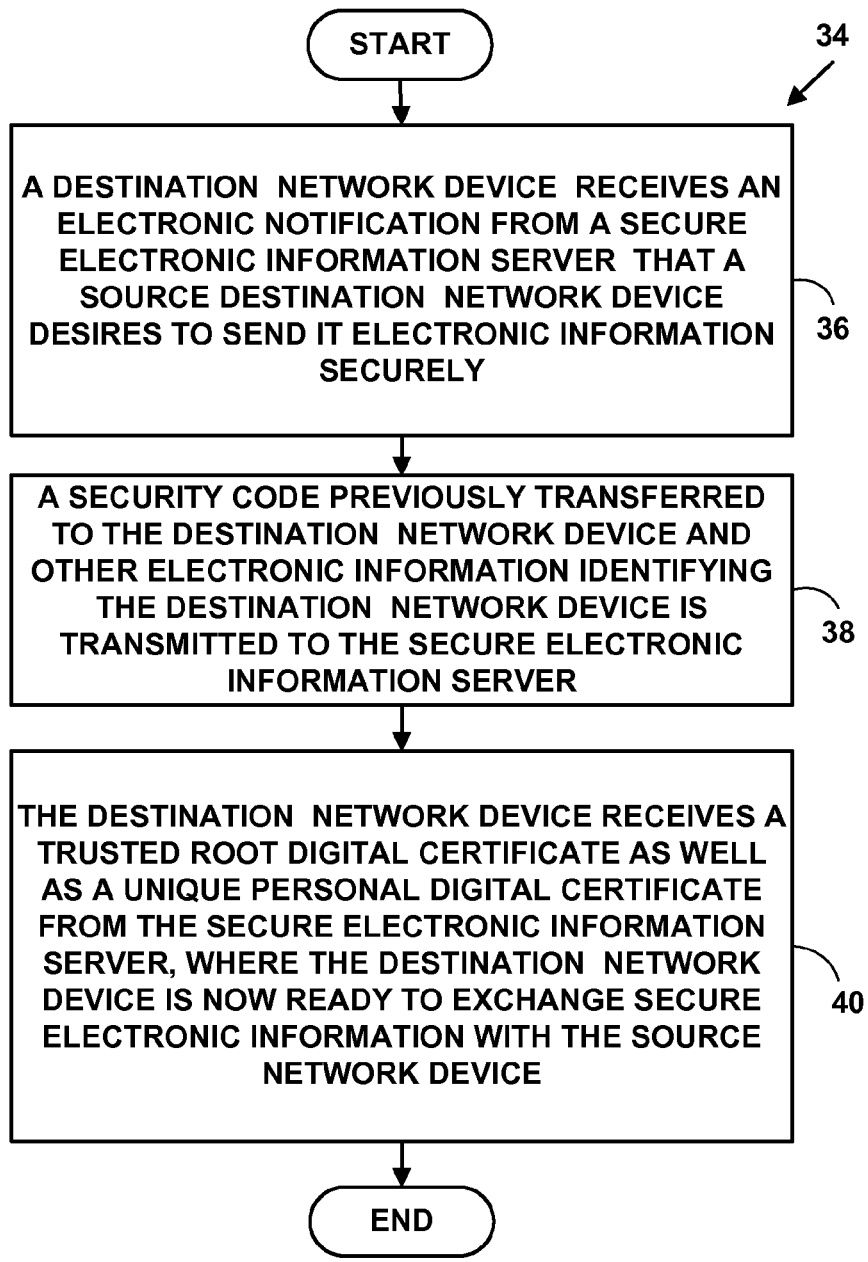

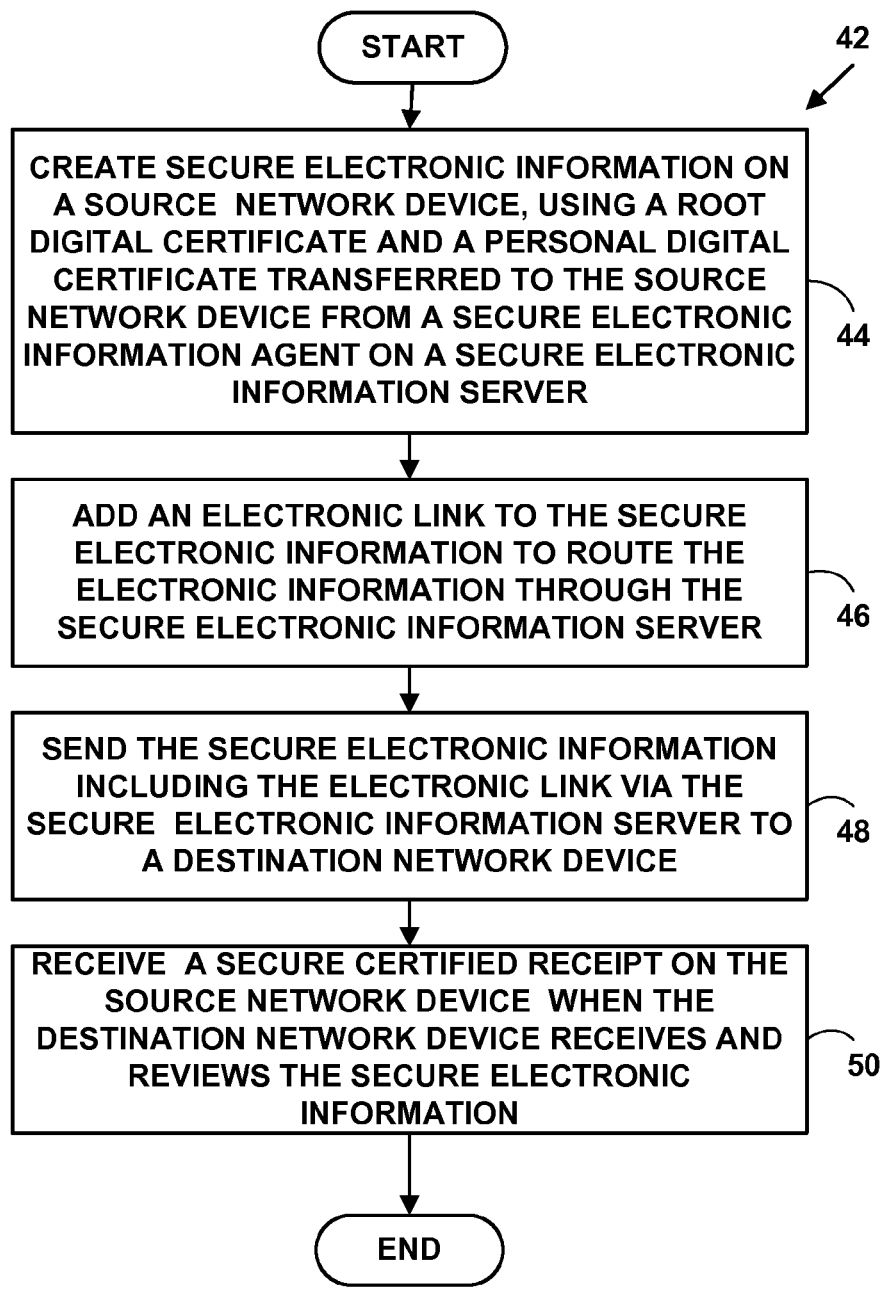

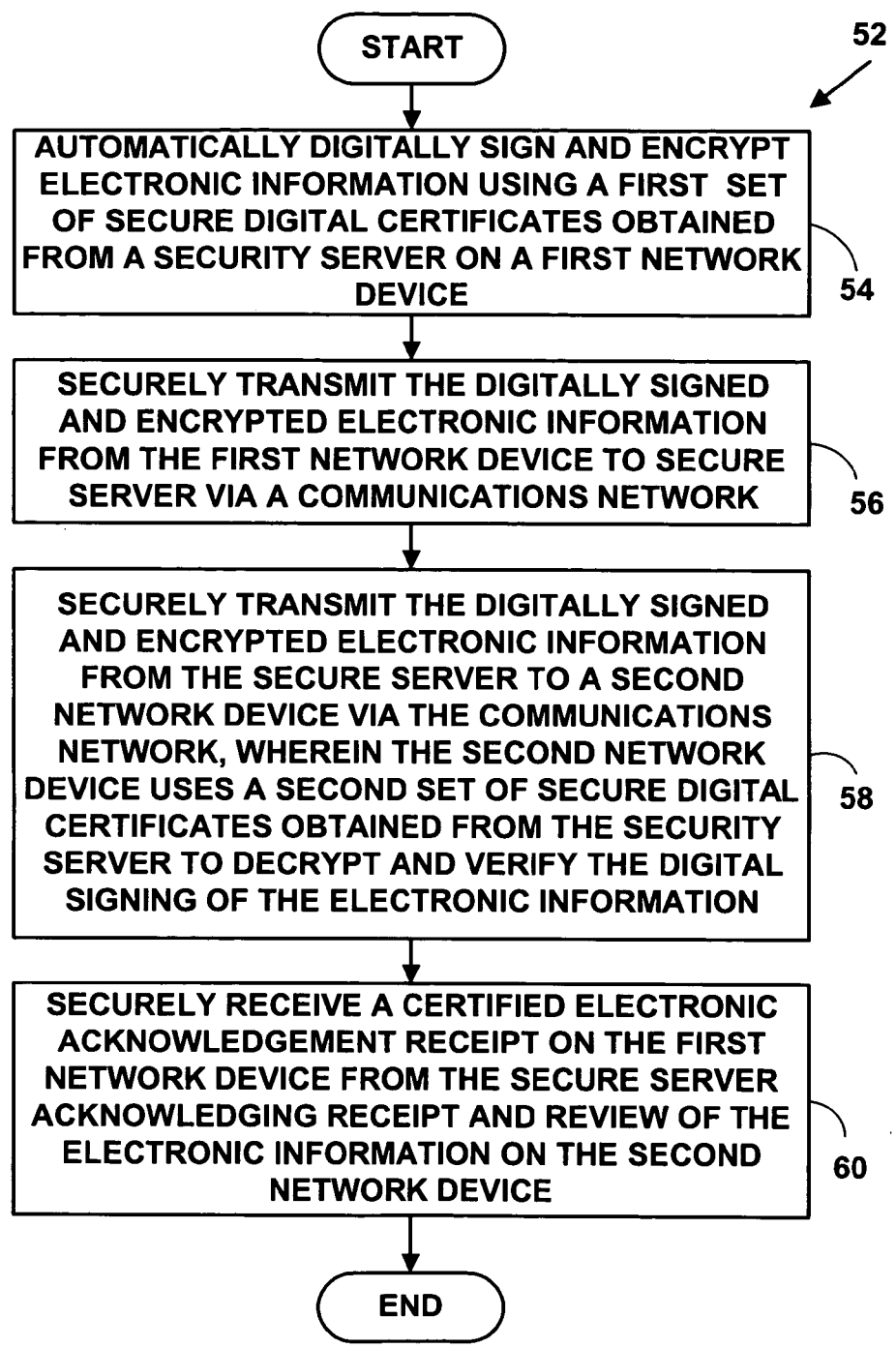

From: CustomerService@PKEMail.com
Sent: Wednesday, January 21, 2004 4:01 PM
To: garrettsmith@contoso.com.pkemail.com
Subject: Certified PKEMail Receipt
Importance: High

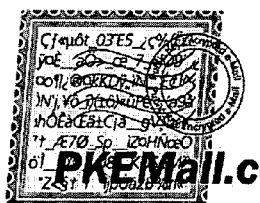

The PKEMail you sent to gailadams@cpal.com.pkemail.com has been successfully reviewed:

Subject: Contract

Message Sent: Wednesday, January 21, 2004 3:00:02 PM
Message Reviewed: Wednesday, January 21, 2004 4:00:06 PM
Time between begin sent and review: 00 days, 01 hours, 00 minutes, 04 seconds
Message ID: 7BF7671C1C7513EC4AEEC9B054FFEF22

Please save this PKEMail Certified Receipt. To view your on-line listing of PKEMails sent / received, please visit PKEMail Reports.

FIG. 14

```
Signing History for document: C:\Contract.doc 2 signer(s) for this document.

Signed by: Garrett Smith
PKE Document ID: 010499FF-EC41-4557-8348-5C4CDC385BB6
PKE Signing ID: 05E67EB8-1A4F-414F-BE2D-0F0C288F3AD9
PKE User ID: gsmith@contoso.com.pkemail.com
Original Document Name: C:\Contract.doc
Signed Document: C:\Contract.pke
Signed on: Friday, January 16, 2004 at 4:29:12 PM GMT.
Received at Server: Friday, January 16, 2004 at 11:29:58 AM E.S.T
Signer Sequence Number: 1
Name on Signing Certificate: Garrett Smith
Company: Contoso Corporation
Department: Procurement
Phone: 312-260-3312
Address: 33 N. LaSalle Street
Address: Chicago,, Illinois – US
Signer Computer Drive Information: Drive Serial Number: 1693047880 Volume Name: REMEMBER Type: Fixed File System: NTFS
Signer IP Address: 209.86.108.68

Signed by: Gail Adams
PKE Document ID: 010499FF-EC41-4557-8348-5C4CDC385BB6
PKE Signing ID: 21C1A335-EA83-476F-9CE9-68D6ECA2BD11
PKE User ID: gailadams@cpal.com.pkemail.com
Original Document Name: C:\Contract.doc
Signed Document: C:\Contractga.pke
Signed on: Friday, January 16, 2004 at 4:45:00 PM GMT.
Received at Server: Friday, January 16, 2004 at 11:45:27 AM E.S.T
Signer Sequence Number: 2
Name on Signing Certificate: Gail Adams
Company: City Power and Light Corporation
Department: Administration
Phone: 212-334-4453
Address: 105 Water Street
Address: New York, New York – US
Signer Computer Drive Information: Drive Serial Number: 44590590345 Volume Name: Documents Type: Fixed File System: NTFS
Signer IP Address: 61.86.103.62
```

METHOD AND SYSTEM FOR SECURE TRANSFER OF ELECTRONIC INFORMATION

CROSS REFERENCES TO RELATED APPLICATIONS

This application claims priority to U.S. Provisional Application 60/493,162 filed on Aug. 7, 2003, the contents of which are incorporated by reference.

FIELD OF THE INVENTION

This invention relates to electronic information. More specifically, it relates to a method and system for secure transfer of electronic information.

BACKGROUND OF THE INVENTION

Businesses and individuals are reluctant to send sensitive information over the Internet due to its open architecture. Electronic mail (e-mail) and emails with attachments sent over the Internet permit examination of the contents at many in-route locations and by electronic interlopers.

Thus it is desirable to provide a method and system to allow businesses and individuals to send electronic information such as e-mails and e-mail attachments securely via the Internet to protect against electronic interlopers. This method and system should be useable for personal e-mails, e-commerce, and business correspondence to for business-to-business, business-to-customer and other types of electronic information.

SUMMARY OF THE INVENTION

In accordance with preferred embodiments of the present invention, some of the problems associated with secure transfer of electronic information are overcome. A method and system for secure transfer of electronic information is presented. The method and system allow secure transfer of electronic information, such as electronic mail (e-mail) using digital certificates.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 2 is flow diagram illustrating a method for providing secure transfer of electronic information;

FIG. 3 is flow diagram illustrating a method for providing secure transfer of electronic information;

FIG. 4 is a flow diagram illustrating a method for securely transferring electronic information;

FIG. 5 is a flow diagram illustrating a method for securely transferring electronic information;

FIG. 8 is a block diagram of illustrating an exemplary certified electronic review receipt;

FIG. 14 is a block diagram illustrating a screen shot of an exemplary output of multi-party signers of an electronic document.

DETAILED DESCRIPTION OF THE INVENTION

Exemplary Secure Electronic Information System

Figure 1:
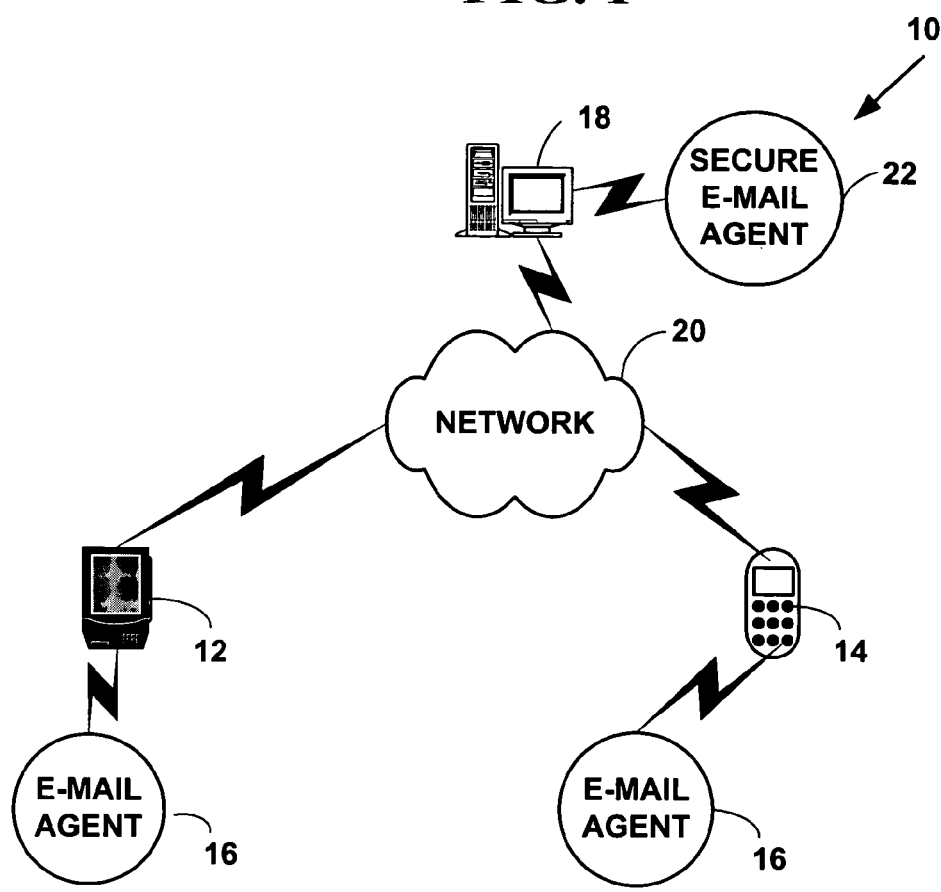
FIG. 1 is a block diagram illustrating an exemplary secure electronic mail system.

FIG. 1 is a block diagram illustrating an exemplary secure electronic information system 10. The secure electronic information system 10 includes plural network devices 12, 14 (two of which are illustrated). The plural network devices 12, 14 include but are not limited to computers, personal digital/data assistants (PDAs), mobile phones, non-mobile phones, interactive TV systems through set top boxes for cable television (CATV), satellite television or other television networks, Internet appliances and other types of network devices. The network device 12, 14 include a secure electronic information agent 16. The secure electronic information agent 16 includes software, firmware, hardware and/or combinations thereof.

The plural network devices 12, 14 communicate with a secure electronic information server 18 using one or more wired or wireless communications protocols over a communications network 20.

The secure electronic information server 18 includes a secure server electronic information agent 22 for providing digital certificates and for sending and receiving secure electronic information as is described below. The secure electronic information server 18 may also include a web-site interface to the Internet. The secure server electronic information agent 22 includes software, firmware, hardware and/or combinations thereof. The secure information includes encrypted information.

As is known in the art, "encryption" is the process of transforming information so it is unintelligible to everyone but an intended recipient. "Decryption" is the process of transforming encrypted information so that it is intelligible again. With most cryptographic schemes, the ability to keep encrypted information secret is based not on the cryptographic method, which is widely known, but on a "key" that is used with the method to produce an encrypted result or to decrypt previously encrypted information.

In general, there are two kinds of cryptosystems: "symmetric" and "asymmetric." Symmetric cryptosystems use the same key (e.g., a secret key) to encrypt and decrypt a message. Symmetric cryptosystems are also called "private-key" cryptosystems.

Asymmetric cryptosystems use two keys; one key (e.g., a public key) to encrypt a message and a different key (e.g., a private key) to decrypt it. Asymmetric cryptosystems are also called "public-key" cryptosystems.

Public-key encryption uses a pair of keys, a "public key" and a "private key." The key pairs are associated with an entity that needs to authenticate its identity electronically, to sign data with a digital signature, to exchange data securely, to encrypt data, etc. A public key is publicly published and is used by others to send encrypted data. However, a corresponding private key is kept secret. Data encrypted with a public key is decrypted with a corresponding private key.

As is known in the art, a "digital certificate" is an attachment added to an electronic message used for security purposes. The most common use of a digital certificate is to verify that a user sending a message is who he or she claims to be, and to provide the receiver with the means to encode a reply to the message. A digital certificate is typically encrypted with a sender's private key and decrypted by a recipient with the sender's public key.

The secure electronic information server 18 with the secure server electronic information agent 22 is a Certificate Authority (CA) for digital certificates. As is known in the art, a CA issues an encrypted digital certificate containing a sender's public key and a variety of other identification information. The CA makes its own public key readily available. All digital certificates issued by the CA are "signed" with the CA's private key to ensure authenticity.

In one embodiment of the invention, the public key/private key pair included within a digital certificate issued by the secure electronic information server 18 is 1024 bits. However, the present invention is not limited to this key size and other key sizes can also be used to practice the invention.

The communications network 20 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 18 providing voice, video and data communications.

The communications network 20 may include one or more gateways, routers, or bridges. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

The communications network 20 may also include one or more servers or access points (AP) including wired and wireless access points (WAP) (not illustrated).

An operating environment for components of the secure electronic information system 10 includes a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU or processor.

Preferred embodiments of the present invention include network devices and home gateway interfaces that are compliant with all or part of standards proposed by the Institute of Electrical and Electronic Engineers ("IEEE"), International Telecommunications Union-Telecommunication Standardization Sector ("ITU"), European Telecommunications Standards Institute (ETSI), Internet Engineering Task Force ("IETF"), U.S. National Institute of Security Technology ("NIST"), American National Standard Institute ("ANSI"), Wireless Application Protocol ("WAP") Forum, Data Over Cable Service Interface Specification (DOCSIS), Bluetooth Forum, or the ADSL Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." DOCSIS documents can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com."

The end user devices 12, 14 include a protocol stack with multiple layers based on the Internet Protocol or Opens Systems Interconnection (OSI) reference model. The protocol stack includes, but is not limited to, Transmission Control Protocol (TCP), User Datagram Protocol (UDP), Internet Protocol (IP), Hypertext Transfer Protocol (HTTP), Simple Mail Transfer Protocol (SMTP), Post Office Protocol version 3 (POP3), Internet Mail Access Protocol (IMAP), and other protocols.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768, incorporated herein by reference.

IP is an addressing protocol designed to route traffic within a network or between networks. For more information on IP 54 see IETF RFC-791, incorporated herein by reference.

HTTP is a standard protocol for communications on the World Wide Web. For more information on HTTP, see IETF RFC-2616, incorporated herein by reference.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on SMTP, see IETF RFC-1939, incorporated herein by reference.

IMAP is a protocol for retrieving e-mail messages from a server. For more information on SMTP, see IETF RFC-1730, incorporated herein by reference.

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

As is known in the art, the OSI reference model is a layered architecture that standardizes levels of service and types of interaction for computers exchanging information through a communications network. The OSI reference model separates network device-to-network device communications into seven protocol layers, or levels, each building—and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

Exchanging Electronic Information Securely

FIG. 2 is flow diagram illustrating a Method 24 for providing secure transfer of electronic information. At Step 26, a source network device 12 registers with a secure electronic information server 18. The registration includes obtaining a root digital certificate and a personal digital certificate that allows secure transfer of electronic information to one or more other destination network devices 14. At Step 28, the source network device 12 securely transfers a security code to a destination network device 14. At Step 30, the source network device receives an electronic notification that the destination network device 14 is ready to receive secure electronic information.

Method 24 is illustrated with an exemplary embodiment. However, the invention is not limited to this exemplary embodiment and other embodiments can also be used to practice the invention.

In such an embodiment at Step 26, when a business or individual of a source network device 12 wishes to securely communicate with a destination network device 14, a user of the source network device 14 logs into a secure web site on the secure e-mail sever 16 to register to send electronic information such as e-mail, securely. Identifying information (e.g., Social Security Number and Mother's Maiden name, etc.), as well as credit card number or other payment information is requested and collected to insure the identity of the user of the source network device. When the identifying information is submitted, a credit card or other electronic payment transaction occurs charging the user of the source network device 12.

The source network device 12 is then directed to a secure web page where the secure e-mail server's 16 trusted root digital certificate (i.e., a public key root digital certificate) is downloaded to the source network device 12 via a secure e-mail agent 22. In addition, the secure e-mail server 18 generates a cryptographically secure unique personal digital certificate, which is also downloaded to the source network device 12 via the secure e-mail agent 22. The trusted root digital certificate permits a user of the source network device 12 to either digitally sign, encrypt, or both, any electronic information such as e-mail and attachments sent to one or more other destination network devices 14.

A user of the source network device 12 can then set up other recipients of secure e-mail by visiting the secure web page on the secure e-mail server 18 and entering certain identifying information about other intended recipients. In addition, a security code is entered into the web-page. This security code is used by the recipient to download recipient certificates. The user of the source network device 12 can create trees or other structured or organized lists of intended recipients. The trees or other structured or organized lists may or may not be interrelated to each other.

At Step 28, the security code is securely transmitted from the source network device 12 to the destination network device 14 by another secure means, such as a telephone call, instant message, another un-secure or secure e-mail, paper mail, etc.

The destination network device 14 receives a communications (e.g., an e-mail) from the secure e-mail server 18 with a notification that secure certificates are ready to be sent to it by a source network device 12. The destination network device 14 enters identifying information. In addition, the security code provided to it by the source network device 12 is entered.

If the entries are validated, the secure e-mail server's 18 trusted root digital certificate as well as a unique personal digital certificate (i.e., a private key personal digital certificate) specifically for the destination network device 14 is downloaded to the destination network device 14.

When the destination network device 14 successfully downloads the certificates, an e-mail notification is sent via the secure e-mail server 18 to the source network device 12 notifying it that it is now possible to send secure electronic information to the destination network device 14.

At Step 30, the source network device 12 receives the e-mail notification from the destination network device 14 via the secure e-mail server 18 notifying it that it is now possible to send secure electronic information to the destination network device 14.

Using a standard e-mail software the originator or recipient can compose and e-mail and add any necessary attachments. With the digital certificates installed on the source and destination devices 12, 14, their respective e-mail s will now permit e-mail to be digitally sign, encrypt, or both, and securely exchanged.

In one embodiment of the invention, the steps of Method 24 are automated and completed automatically for a user, when a user executes a script a network device 12, 14.

FIG. 3 is flow diagram illustrating a Method 32 for providing secure transfer of electronic information. At Step 34 a destination network device 14 receives an electronic notification from a secure electronic information server 18 that a source destination network device 12 desires to send it electronic information securely. At Step 36, a security code previously transferred to the destination network device 14 and electronic information identifying the destination network device 14 is transmitted to the secure electronic information server 18. At Step 38, the destination network device 14 receives a trusted root digital certificate as well as a unique personal digital certificate from the secure electronic information server 18. The destination network device 14 is now ready to exchange secure electronic information with the source destination network device 12.

Method 32 is illustrated with an exemplary embodiment. However, the invention is not limited to this exemplary embodiment and other embodiments can also be used to practice the invention.

In such an exemplary embodiment at Step 34, a destination network device 14 receives an e-mail from a secure e-mail server 18 that a source destination network device 12 desires to send it e-mail securely. At Step 36, a security code previously transferred to the destination network device 14 (e.g., at Step 28 of Method 24) and electronic information identifying the destination network device 14 is transmitted to the secure electronic information server 18. At Step 38, the destination network device 14 receives a trusted root digital certificate (i.e., public key) as well as a unique personal digital certificate (i.e., private key) from the secure e-mail server 18. The destination network device 14 is now ready to exchange secure e-mail with the source destination network device 12.

As was described above, when the destination network device 14 successfully downloads the digital certificates, an e-mail notification is sent via the secure e-mail server 18 to the source network device 12 (e.g., received by the source network device 12 at Step 30 of Method 24) notifying it that it is now possible to send secure electronic information to the destination network device 14.

FIG. 4 is a flow diagram illustrating a Method 42 for securely transferring electronic information. At Step 44, secure electronic information is created on a source network device 12 using a root digital certificate and a personal digital certificate transferred to the source network device 12 from a secure electronic information agent 22 on a secure electronic information server 18. At Step 46, an electronic link is added to the secure electronic information to route the information through the secure electronic information server 18. At Step 48, the secure electronic information is sent to the destination network device 14 using the electronic link to route it through the secure electronic information server 18. At Step 50, a secure certified receipt is received on the source network device 12. The secure electronic information server 18 generates a secure receipt when a destination network device 14 accesses the electronic information.

Method 42 is illustrated with an exemplary embodiment. However, the invention is not limited to this exemplary embodiment and other embodiments can also be used to practice the invention.

In such an exemplary embodiment at Step 44, a secure e-mail is created on a source network device 12 using a root digital certificate (i.e., public key) and a personal digital certificate (i.e., private key) transferred to the source network device 12 from the secure e-mail agent 22 on a secure e-mail server 18 as was described by Step 26 of Method 24 above. The e-mail is automatically encrypted and/or digitally signed by the originator using the digital certificates.

At Step 46, an electronic link is added to the secure electronic information to route the information through the secure e-mail server 18. In one embodiment at Step 46, the secure e-mail server 18 adds an electronic link, such as a specially formatted Hyper Text Markup Language ("HTML") link or Domain Name System ("DNS") to the e-mail which generates one or more messages when the e-mail is opened on the destination network device 14.

For example, if the message is going to Johndoe@aol.com, the sender will enter Johndoe@aol.com.secureserver.com. This routes the e-mail message securely to the secure e-mail server 18. The e-mail message with the electronic link is not stored on the secure e-mail server 18, but is instead passed on to the destination network device 14.

In one embodiment of the invention, the secure e-mail server 18 logs the message, an originating IP address, and other identifying information about the originator and stores it in a database. In another embodiment, no information is logged by the secure e-mail server 18.

At Step 48, the e-mail message is sent to the destination network device 14 via the secure e-mail server 18.

At Step 50, when the encrypted and/or digitally signed e-mail is opened, the electronic link is accessed and generates one or more messages notifying the secure e-mail server 18 that the e-mail message was opened. A secure certified receipt is sent in one or more e-mails to the source network device 12 with details of the message, including a time stamp indicating when it was accessed, etc. The source network device 12 receives the message including the secure receipts. Reports and e-mails are securely provided to originators of e-mails acknowledging the intended recipient received the e-mails.

Since the secure electronic information server 18 sends the certified electronic acknowledgement receipt automatically, a user of the destination network device 14 cannot deny accessing and/or reviewing the secure electronic information. In addition, since the certified electronic acknowledgement include a timestamp, it makes it difficult for a user of the destination network device 14 to indicate they review the secure electronic information at a time other than indicated by the timestamp.

FIG. 5 is a flow diagram illustrating a Method 54 for securing transferring electronic information. At Step 54, electronic information is automatically digitally signed and encrypted using a first set of secure digital certificates obtained from a secure electronic information server 18 on a source network device 12. At Step 56, the digitally signed and encrypted electronic information is securely transmitted from the source network device to the secure electronic information server 18 via a communications network 20. At Step 58, the digitally signed and encrypted electronic information is securely transmitted from the secure electronic information server 18 to a destination network device via the communications network 20. The destination network device uses a second set of secure digital certificates obtained from the secure electronic information server 18 to decrypt and verify the digital signing of the electronic information. At Step 60, a certified electronic acknowledgement receipt is received on the source network device 12 from the secure electronic information server 18 acknowledging receipt and review of the electronic information on the destination network device 14.

Method 52 is illustrated with one exemplary embodiment. However, the present invention is not limited to such an embodiment and other embodiments can be used to practice the invention.

In such an exemplary embodiment at Step 54, electronic information such an e-mail or an electronic document is digitally signed and encrypted on a source network device using a first set of secure X.509 certificates (e.g., public and private key) obtained from a secure electronic information server 18 via a communications network 20. However, the present invention is not limited to X.509 certificates and other types of digital certificates can also be used to practice the invention.

As is known in the art, X.509 is a standard for Public Key Infrastructure. X.509 specifies standard formats for public key encryption certificates. For more information, see IETF RFC-3280, incorporated herein by reference.

Figure 6A:
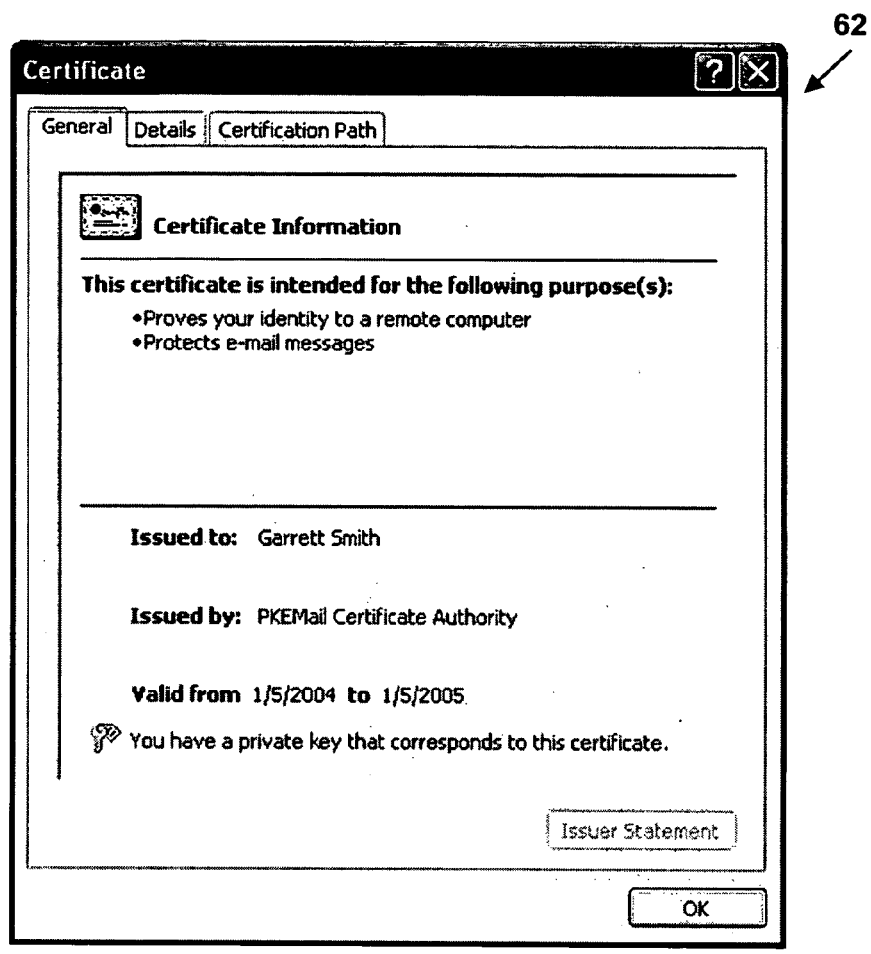
FIGS. 6A and 6B are block diagrams illustrating screen shots of an exemplary X.509 certificate obtained from the security server.
Figure 6B:
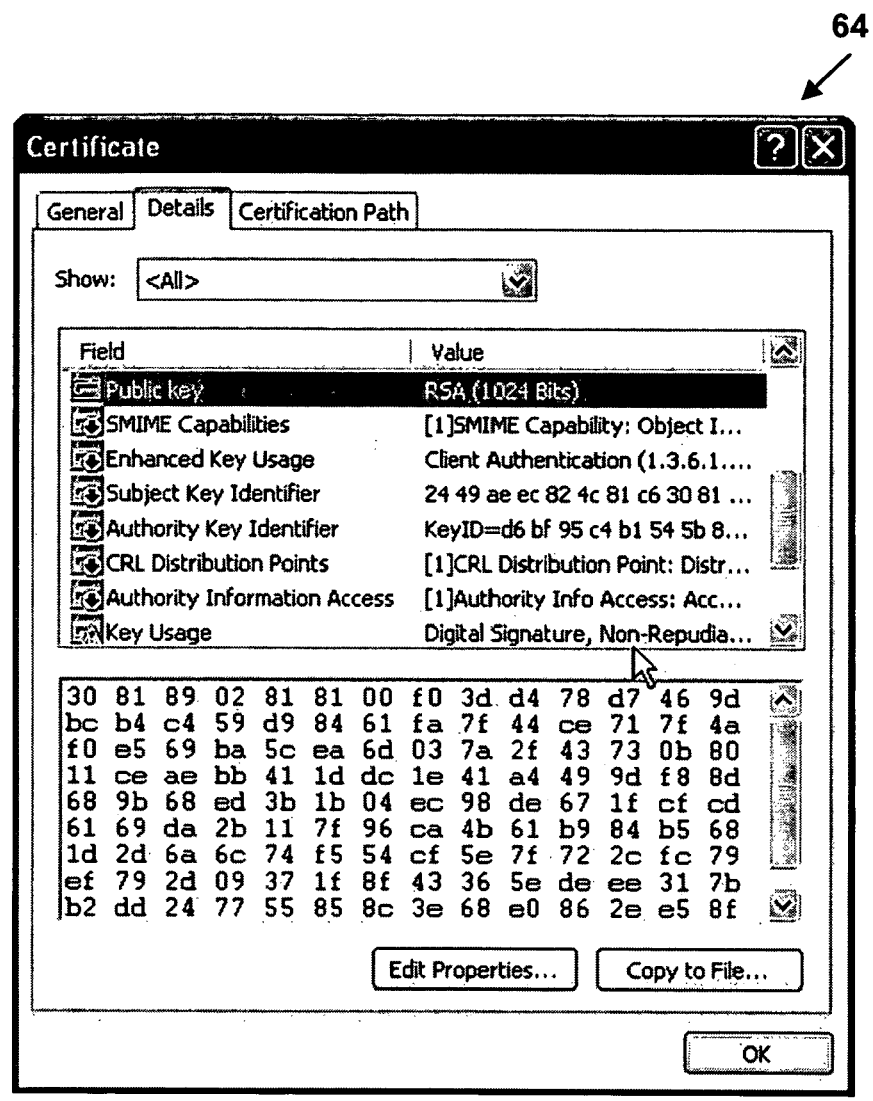

FIGS. 6A and 6B are block diagrams 62, 64 illustrating a screen shot of an exemplary X.509 certificate obtained from the security server 18.

The X.509 certificate is associated with an e-mail account and can send/receive encrypted and/or digitally signed e-mail and any attachment(s). The X.509 certificate can also be used to digital sign a plain text document such as an electronic contract, etc.

In one embodiment of the invention, the X.509 certificate is added to an Outlook or Outlook Express e-mail program by Microsoft Corporation of Redmond, Wash. However, the present invention is not limited to Outlook or Outlook Express and other types of e-mail programs can also be used to practice the invention.

At Step 56, the digitally signed and encrypted e-mail is securely transmitted from the source network device 12 to the secure electronic information server 18 via the communications network 20.

In one embodiment of the invention, the digital signed and encrypted e-mail is securely transmitted from the source network device 12 with further security features over a SMTP or POP3 connection.

In one embodiment of the invention, the digital signed and encrypted e-mail is securely transmitted from the source network device 12 using additional security features including using a Secure Sockets Layer (SSL) connection. In another embodiment of the invention, the digital signed and encrypted e-mail is securely transmitted from the source network device 12 using additional security features including Transport Layer Security (TLS). In another embodiment of the invention, the digital signed and encrypted e-mail is securely transmitted from the source network device 12 using IP Security (IPsec).

As is known in the art, the SSL protocol is a protocol layer which may be placed between a reliable connection-oriented network layer protocol (e.g. TCP/IP) and the application protocol layer (e.g. HyperText Transport Protocol (HTTP)). SSL provides for secure communication between a source and destination by allowing mutual authentication, the use of digital signatures for integrity, and encryption for privacy.

The SSL protocol is designed to support a range of choices for specific security methods used for cryptography, message digests, and digistal signatures. The security method are negotiated between the source and destingation at the start of establishing a protocol session. The SSL 2.0 protocol specification, by Kipp E. B. Hickman, 1995 is incoroporated herein by reference. More information on SSL is available at the URL See "netscape.com/eng/security/SSL 2.html."

As is known in the art, TLS provides communications privacy over the Internet. The protocol allows /server applications to communicate over a transport layer (e.g., TCP) in a way that is designed to prevent eavesdropping, tampering, or message forgery. For more information on TLS see IETF RFC-2246, incorporated herein by reference.

As is known in the art, IPsec is security protocol that provides authentication and encryption over the Internet. Unlike SSL, which provides services at OSI layer 4 and secures two applications, IPSec works at layer 3 (i.e., the OSI network layer) and secures networks including VPNs. The phone-based home gateway interface 18 also provides IPsec for secure communications (e.g., for VPNs). For more information on IPsec see IETF RFC-2401, the contents of which are incorporated by reference.

At Step 58, the digitally signed and encrypted electronic information is securely transmitted from the secure electronic information server 18 to a destination network device 14 via the communications network 20. The destination network device 14 uses a second set of digital certificates (e.g., public and private key) obtained from the secure electronic information server 18 to decrypt and verify the digital signing of the electronic information. The digitally signed and/or encrypted e-mails get routed through the secure electronic information server 18 and send to the recipient network device 14.

At Step 60, a certified electronic acknowledgement receipt is received on the source network device 12 from the secure electronic information server 18 acknowledging receipt and review of the electronic information on the destination network device 14.

Since the secure electronic information server 18 sends the certified electronic acknowledgement receipt automatically, a user of the destination network device 14 cannot deny accessing and/or reviewing the secure electronic information. In addition, since the certified electronic acknowledgement include a timestamp, it makes it difficult for a user of the destination network device 14 to indicate they review the secure electronic information at a time other than indicated by the timestamp.

Figure 7:
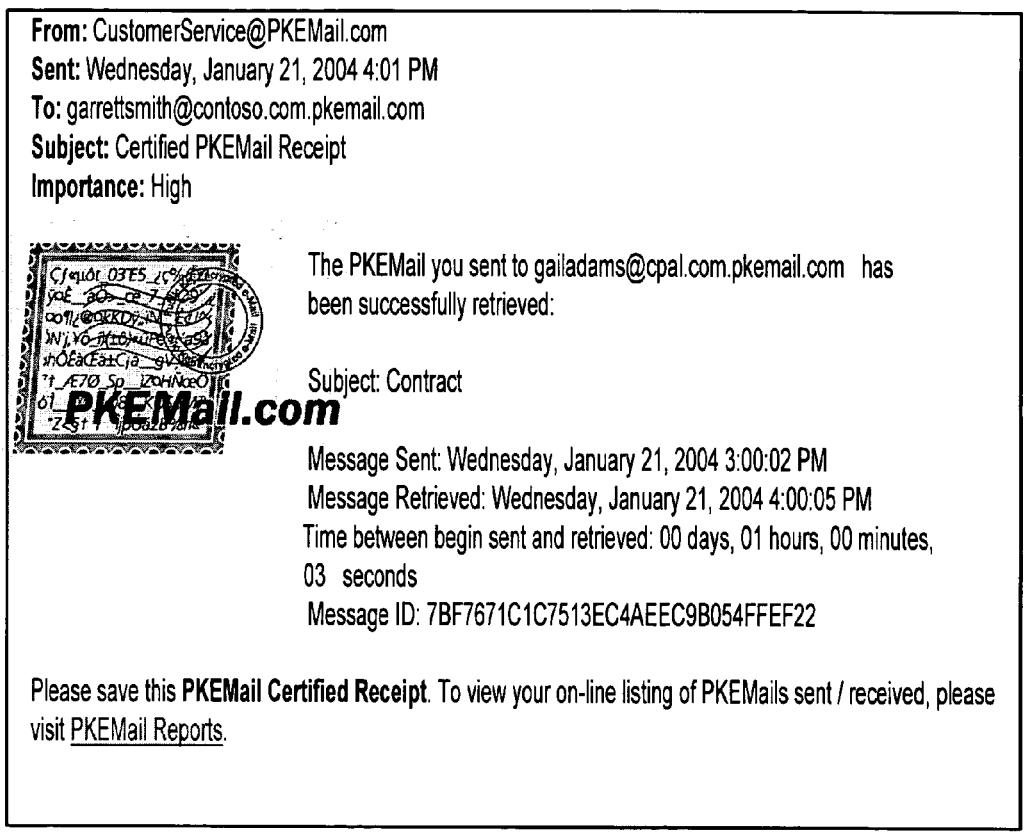
FIG. 7 is a block diagram illustrating an exemplary certified electronic acknowledgement receipt.

FIG. 7 is a block diagram 66 illustrating an exemplary certified electronic acknowledgement receipt.

FIG. 8 is a block diagram 68 illustrating an exemplary certified electronic review receipt.

The two certified electronic acknowledgement and review receipts are combined into on receipt if a user immediately reviews an e-mail after it is downloaded into his/her mailbox.

No one except the intended recipient can read the secure electronic information once it leaves the source network device 12. Even if the secure electronic information is intercepted by a thief, the secure electronic information is unreadable and secure. When the recipient network device 14 retrieves the secure electronic information from the secure electronic information server 18, it is deleted. No one can read the secure electronic information on the secure electronic information server 18 because it is stored as encrypted by the source network device 12.

Reports are also securely provided to originators of e-mails acknowledging the intended recipient received the e-mails via a web-site interface on the secure electronic information server 18.

Figure 9:
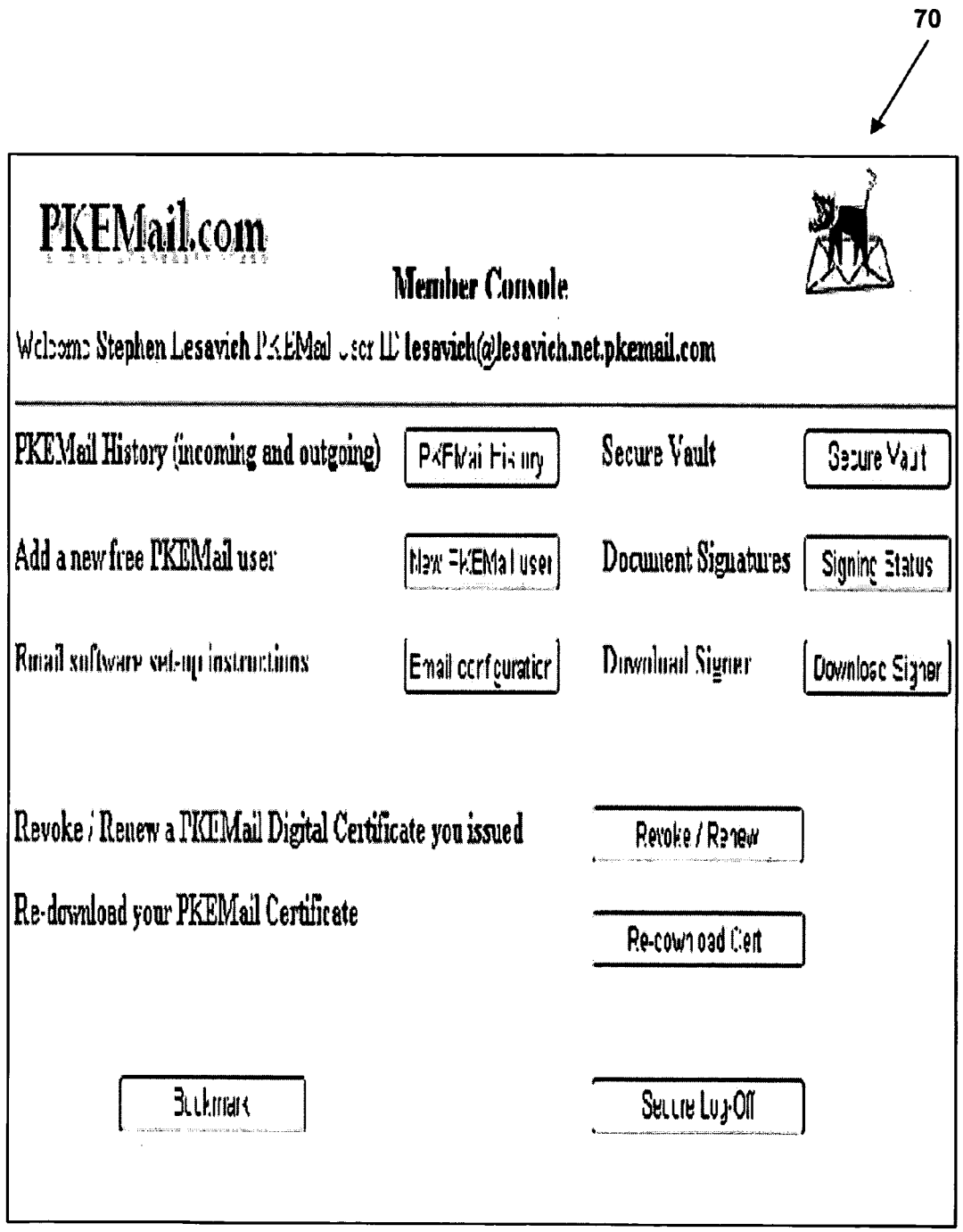
FIG. 9 is a block diagram of a screen shot illustrating a web-site interface on secure electronic information server 18 for obtaining reports and other summary information.

FIG. 9 is a block diagram of a screen shot 70 illustrating a web-site interface on secure electronic information server 18 for obtaining reports and other summary information.

If there is ever a need to revoke a digital certificate issued by the secure electronic information server 18, for example, if an employee leaves the company, supplier are changed or if a network device is stolen, the digital certificate can be revoked immediately by the secure electronic information server 18 and it will no longer accept transactions from this party. A network device 12 e-mail agent 16 (e.g., Outlook XP) automatically queries the secure electronic information server 18 each time secure electronic information (e.g., e-mail) is sent or received insuring it's validity.

Figure 10:
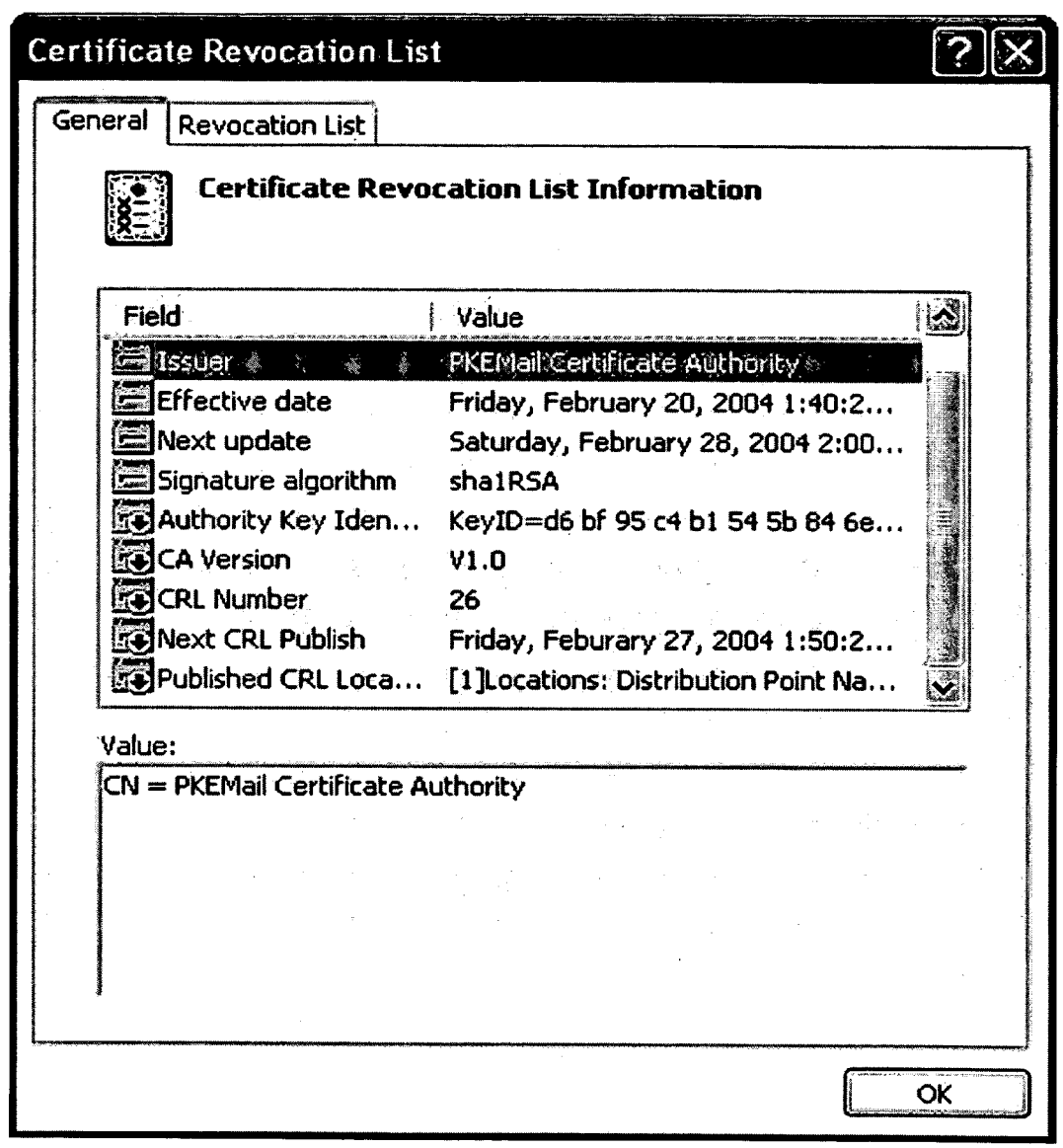
FIG. 10 is a block diagram of a screen shot illustrating a revoked digital certificate issued by secure electronic information server.

FIG. 10 is a block diagram of a screen shot 72 illustrating a revoked digital certificate issued by secure electronic information server 18.

If a printed copy of any signed electronic document is required, a paper copy can be produced. An option is provided in the secure e-mail agent 16 on a network device.

The methods and systems described herein allow multiple parties to electronically sign an electronic document. The multiple parties are users who have obtained digital certificates from the secure electronic information server 18 and non-users have not obtained digital certificates from the secure electronic information server 18.

Figure 11:
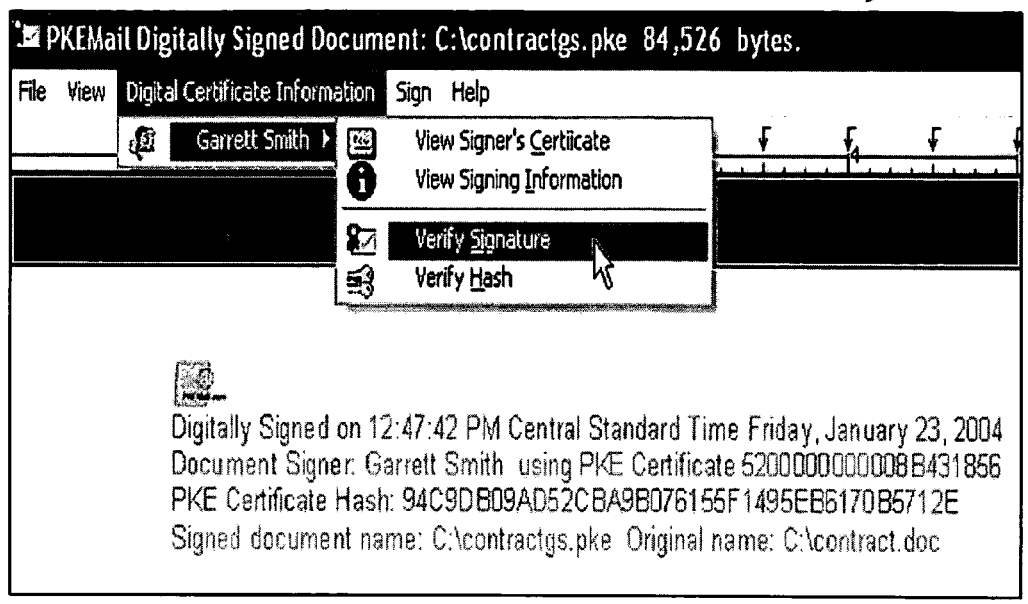
FIG. 11 is a block diagram illustrating a screen shot of the multi-party signature feature.

FIG. 11 is a block diagram 74 illustrating a screen shot of the multi-party signature feature.

A user reads the agreement and accepts this digital signature is legally binding. The signer must click Accept, enter his/her name, and then click Sign. The document is electronically signed using the digital certificates obtained from the secure electronic information server. In one embodiment, a signature is shown in a script font providing a visual cue that this is a signature.

Figure 12:
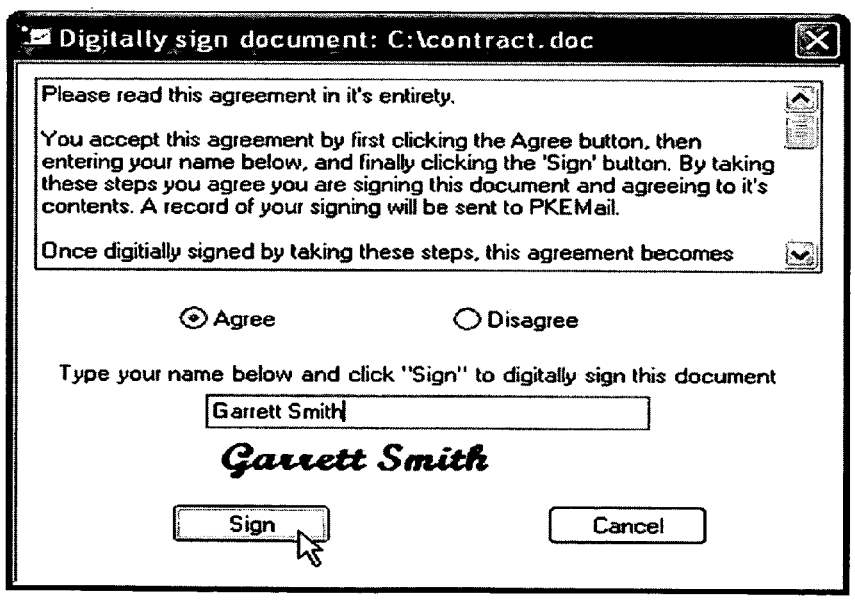
FIG. 12 is a block diagram illustrating a screen shot of electronically signing for the paper copy feature.

FIG. 12 is a block diagram 76 illustrating a screen shot of electronically signing for the multi-party feature.

When the document is signed, audit meta data about the electronic signing is sent to the secure electronic information server 18. An atomic clock is queried providing the time in Greenwich Mean Time (GMT). If a signer attempts to sign a document before the previous signer, the process is disallowed.

Figure 13:
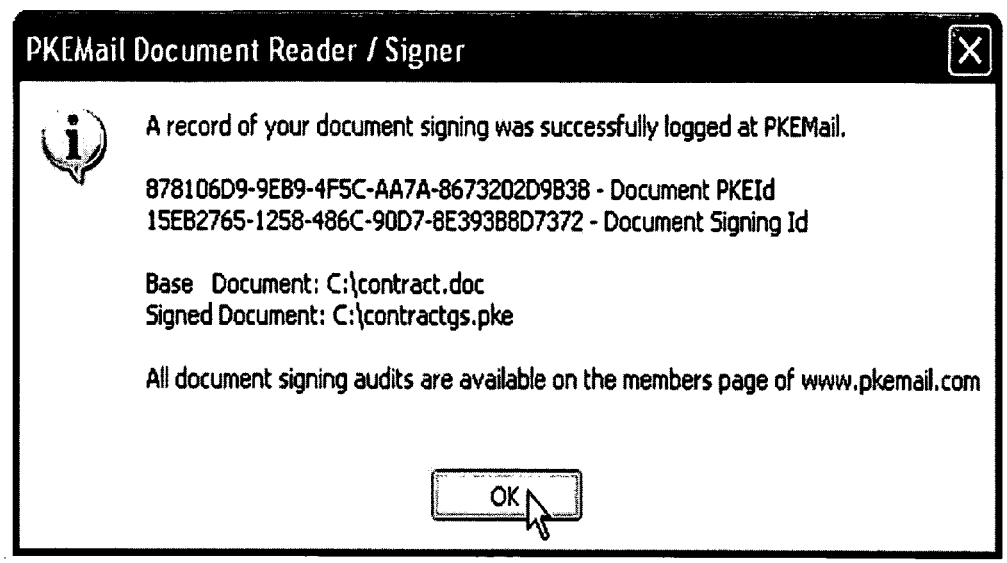
FIG. 13 is a block diagram illustrating a screen shot of a result of electronically signing for the multi-party signing feature.

FIG. 13 is a block diagram 78 illustrating a screen shot of a result of electronically signing for the multi-party signing feature.

A signed document is assigned a unique identifier (ID) constant across signers by the secure electronic information server 18. Each signer receives a unique ID. All signers of a document can review its status on the secure electronic information server 18.

The method and system provide the ability to digitally sign/encrypt documents off line. When a user has received their digital certificate from the secure electronic information server 18 they can use this document signing service to digitally sign a document. Information about the signing of the document may be sent to the server as an audit trail. The document is digitally signed using the digital certificate provided to the user. This secure document can then be sent via e-mail, or other medium, to another user or non-user. A non-user can retrieve the secure document from the secure electronic information server 18 to insure the document is correctly digitally signed.

FIG. 14 is a block diagram 80 illustrating a screen shot of an exemplary output of multi-party signers of an electronic document.

The present invention includes a Secure Vault which allows a user to send secure documents to users who have obtained digital certificates from the secure electronic information server 18 and for non-users who have not obtained digital certificates from the secure electronic information server 18.

The secure vault allows a user to send secure documents to non-users. The user uploads a document to the secure electronic information server 18 using SSL. The secure electronic information server 18 will store the document and allow the user to grant access to retrieve the document. When the user grants access to the document to another user or non-user, an e-mail is sent to the intended recipient with a link to the server using SSL. Upon authorization (e-mail address, password, or other means of identification is provided), the server downloads the document to the recipient using SSL.

When a user of the system is set up, information is sent from the secure electronic information server to the user's network device which automatically installs the secure mail agent 16 via a mail account (e.g., Outlook, Outlook Express, etc.).

For Outlook or Outlook Express this is accomplished by sending a signed Cabinet (CAB) file, an initialization (.INF) file, an ActiveX control, or other means. However, the present invention is not limited to this embodiment and other embodiments for other mail systems can be used to practice the invention.

In addition, it is likely that a user digital certificate's digital ID can be extracted from its digital certificate and it's digital thumbprint can be also added to the account set up, eliminating the need for a user to manually associate the certificate with the new e-mail account.

The methods and systems described herein provide at least: (1) Authorization —a confidential message only goes to the intended recipient; (2) Authentication—The use of digital certificates insure the identity of the sender and the recipient; (3) Encryption—Even if a confidential message was intercepted, it can not be decoded or read by the thief; (4) May be legally binding—The Federal Electronic Signatures in Global and National Commerce Act (15 U.S.C. 7001, et seq.) establishes electronic digital signatures have the same legal effect as handwritten signatures on paper; (5) "Electronic Certified Delivery"—the certified receipt shows the exact date/time the recipient received and reviewed the electronic information On-line, real time reports allow tracking of all incoming and outgoing information; (6) can assist in meeting Health Insurance Portability and Accountability Act of 1996 (HIPAA) requirements.

The method and system described herein can be used by: (1) Attorneys—Most law firms are reluctant to send information via e-mail. Law firms can now set up any number of clients to receive digital certificates and start exchanging sensitive information securely and easily; (2) Banks and Financial Institutions—Since almost everyone regularly uses e-mail today, digital certificates can be supplied to clients. Loan information, account management, stock transaction details, etc. can instantly be sent with complete security to customers while meeting stringent identification requirements; (3) Travelers—Many times calling professionals are just about to meet a customer and contract terms are changed. Now, a sales force can be equipped with digital certificates and deliver digitally signed and encrypted documents while they are on the road; and (4) Geographically dispersed company offices—There are times when an office in New York receives set up forms that must be sent overnight to Chicago for implementation. The method and system streamlines back office operations, tracks your secure documents so none get misplaced, and enhances customer satisfaction by dramatically shortening implementation time.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for securely transferring electronic information, comprising:
   creating secure electronic information on a source network device with one or more processors using a root digital certificate and a personal digital certificate transferred to the source network device from a secure electronic information server with one or more processors via a communications network;
   adding an electronic link to the secure electronic information to route the information through the secure electronic information server, wherein the electronic link generates one or more electronic messages that are securely sent to the source network device to indicate the secure electronic information was received on a destination network device and wherein the electronic link allows the secure electronic information to be identified, sent and routed without storing the secure electronic information with the added link on the secure electronic information server, and wherein the electronic link is specially formatted to generate one or more other electronic messages when the secure electronic information is accessed on the destination network device;

sending the secure electronic information to the destination network device with one or more processors via the communications network using the electronic link to route the secure electronic information through the secure electronic information server, wherein the secure electronic information with the added electronic link is not stored on the secure electronic information server and wherein the secure electronic server does not record any identifying information about the source network device and the secure electronic information with the added electronic link;

receiving via the communications network a secure certified receipt on the source network device, wherein the secure electronic information server generates the secure certified receipt using the electronic link when the destination network device accesses the secure electronic information, wherein the secure certified receipt indicates the secure electronic information was received and accessed on the destination network device and includes a secure timestamp and date.

2. A computer readable medium having stored therein instructions for causing a processor to execute the steps of the method of claim 1.

3. The method of claim 1 wherein the root and personal digital certificates are X.509 digital certificates.

4. The method of claim 1 wherein the root digital certificate is a public key digital certificate and the personal digital certificate is a private key digital certificate.

5. The method of claim 1 where the secure electronic information includes secure electronic mail and secure electronic documents.

6. The method of claim 5 wherein the secure electronic documents include secure electronic legal documents.

7. The method of claim 1 wherein the communications network includes the Internet.

8. The method of claim 1 wherein the electronic link is a Hyper Text Markup Language link or a Domain Name System link.

9. The method of claim 1 wherein the secure certified receipt includes an indication of a time period between when the secure electronic information was sent from the source network device and when it was accessed on the destination network device.

10. The method of claim 1 wherein the secure electronic information server includes a digital certificate authority.

11. A secure electronic information system, comprising in combination:

a secure electronic information server with one or more processors on a communications network for providing secure digital certificates to one or more source network devices with one or more processors, for accepting secure electronic information created with the provided secure digital certificates from the one or more source network devices, for routing the secure electronic information created using the secure digital certificates, wherein the secure electronic information includes an electronic link added to the secure electronic information, wherein the electronic link allows the secure electronic information to be identified, sent and routed without storing the secure electronic information with the added electronic link on the secure electronic information server, wherein the secure electronic information server does not record any identifying information about the secure electronic information with the added electronic link or the one or more source network devices and wherein the electronic link is specially formatted to generate one or more messages when the secure electronic information is received and one or more other messages when the secure electronic information is accessed on a destination network device with one or more processors, for sending and routing secure certified electronic acknowledgement receipts using the electronic link added to the secure electronic information when the secure electronic information is accessed and reviewed and for producing electronic reports and electronic audit trails for accepted and transmitted secure electronic information;

a secure electronic document signer for allowing a plurality of signers to electronically sign a secure electronic document created using secure digital certificates obtained from the secure electronic information server, wherein the electronic link is added to secure electronic document signed by the plurality of signers and is sent to the destination network device via the secure electronic information server; and a secure electronic vault on the secure electronic information server for uploading secure documents other than the secure electronic information including the added electronic link, from the one or more source network devices, for storing the secure documents, for granting access to the secure documents to other users who have obtained secure digital certificates from the secure electronic information server and other users who have not obtained secure digital certificates from the secure electronic information server, and for sending an electronic mail message to a target network device with one or more processors that has been granted access to a selected secure document in the secure electronic vault, the electronic mail message including another electronic link to securely link the target network device back to the secure electronic vault on the secure electronic information server to access the selected secure electronic document.

* * * * *